(12) United States Patent
Hellsten (10) Patent No.: US 7,876,256 B2
(45) Date of Patent: Jan. 25, 2011

(54) ANTENNA BACK-LOBE REJECTION (75) Inventor: Hans Hellsten, Linköping (SE)

(73) Assignee: SAAB AB (SE)

( * ) Notice: Subject to any disclaimer, the term of this patent is extended or adjusted under 35 U.S.C. 154(b) by 237 days.

(21) Appl. No.: 11/791,065

(22) PCT Filed: Nov. 26, 2004

(86) PCT No.: PCT/SE2004/001744

§ 371 (c)(1),
(2), (4) Date: Jul. 3, 2008

(87) PCT Pub. No.: WO2006/057583

PCT Pub. Date: Jun. 1, 2006

(65) Prior Publication Data

US 2009/0051584 A1    Feb. 26, 2009

(51) Int. Cl.
G01S 13/00 (2006.01)
G01S 13/52 (2006.01)
G01S 3/16 (2006.01)

(52) U.S. Cl. ............... 342/25 A; 342/25 R; 342/81; 342/89; 342/159; 342/379; 342/381

(58) Field of Classification Search ............. 342/25 R, 342/25 A, 25 B, 25 C, 25 D, 25 E, 25 F, 75–81, 342/89, 156, 159, 378–384
See application file for complete search history.

(56) References Cited

U.S. PATENT DOCUMENTS

| | | | | | |
|---|---|---|---|---|---|
| 3,435,453 | A | * | 3/1969 | Howard | 342/383 |
| 3,938,153 | A | * | 2/1976 | Lewis et al. | 342/381 |
| 4,044,359 | A | * | 8/1977 | Applebaum et al. | 342/379 |
| 4,196,436 | A | * | 4/1980 | Westerman | 342/380 |
| 4,367,472 | A | * | 1/1983 | Hauptmann et al. | 342/91 |
| 4,434,424 | A | * | 2/1984 | Old | 342/381 |
| 4,573,051 | A | * | 2/1986 | Farina | 342/17 |
| 4,628,321 | A | * | 12/1986 | Martin | 342/379 |
| 4,866,446 | A | * | 9/1989 | Hellsten | 342/25 A |
| 4,965,582 | A | * | 10/1990 | Hellsten | 342/25 A |
| 5,043,734 | A | * | 8/1991 | Niho | 342/25 A |
| 5,111,214 | A | * | 5/1992 | Kumpfbeck et al. | 343/841 |
| 5,610,610 | A | * | 3/1997 | Hudson et al. | 342/25 F |
| 5,982,319 | A | * | 11/1999 | Borden et al. | 342/25 A |
| 6,072,420 | A | * | 6/2000 | Hellsten | 342/25 A |

(Continued)

OTHER PUBLICATIONS

"International Search Report for Application No. PCT/SE2004/001744", 2 Pages.

(Continued)

*Primary Examiner*—Thomas H Tarcza
*Assistant Examiner*—Peter Bythrow
(74) *Attorney, Agent, or Firm*—Schwegman, Lundberg & Woessner, P.A.

(57) ABSTRACT

A method of for processing signals in a radar system is shown comprising an antenna system having at least two antenna elements, a beam forming arrangement (ABF_RX, ABF_TX) for selectively steering the directivity of the antenna system in a given selected direction, the directivity of the antenna system having a main lobe in the selected direction and a back lobe (BL) in another direction and of a lower magnitude than the main lobe. By utilizing various scale and subtract processing both noise levels and ghost signals can be considerably reduced. A SAR radar apparatus has moreover been shown.

24 Claims, 8 Drawing Sheets

U.S. PATENT DOCUMENTS

| | | | | |
|---|---|---|---|---|
| 6,100,844 | A | * | 8/2000 | Whiting et al. .............. 342/379 |
| 6,731,233 | B2 | * | 5/2004 | Hofele et al. ................. 342/17 |
| 2003/0058159 | A1 | * | 3/2003 | Bickert et al. ............... 342/174 |
| 2003/0095067 | A1 | * | 5/2003 | Howell ....................... 342/377 |
| 2009/0051584 | A1 | * | 2/2009 | Hellsten ................... 342/25 A |

OTHER PUBLICATIONS

"European Application Serial No. 04809016.1, Communication dated Sep. 10, 2007", 3 pgs.

"European Application Serial No. 04809016.1, Response filed Feb. 29, 2008 to Communication dated Sep. 10, 2007", 56 pgs.

"International Application Serial No. PCT/SE2004/001744, International Preliminary Report on Patentability completed Nov. 14, 2006", 6 pgs.

"International Application Serial No. PCT/SE2004/001744, International Search Report mailed Jun. 23, 2005", 3 pgs.

"International Application Serial No. PCT/SE2004/001744, Written Opinion mailed Jun. 23, 2005", 5 pgs.

* cited by examiner

ANTENNA BACK-LOBE REJECTION

RELATED APPLICATIONS

This application is a nationalization under 35 U.S.C. 371 of PCT/SE2004/001744, filed Nov. 26, 2004 and published as WO 2006/057583 A1, on Jun. 1, 2006; which application and publication are incorporated herein by reference and made a part hereof.

FIELD OF THE INVENTION

The present invention relates to radar systems.

More specifically, the present invention relates to synthetic aperture radar (SAR) system radar systems. More particularly, the invention relates to an airborne synthetic aperture radar (SAR) system comprising omni-directional boom antennas mounted parallel to one another.

BACKGROUND OF THE INVENTION

Narrow Antenna Beam SAR

According to the SAR principle, numerous radar pulses are transmitted along a flight path. The responses from the ground are recorded and stored along the flight path. Thereby, the SAR system can be compared to a stationary array antenna consisting of as many array elements as the number of pulses emitted along the path. The flight path builds a "synthetic aperture".

In the early days of synthetic aperture radar, the antenna had a relatively restricted beam width and was operating at a restricted signal bandwidth, for instance in the microwave range. For stripmap SAR, the ground surface could be depicted using Fast Fourier Transform (FFT) algorithms for the image formation. This method requires only a limited computing processing power.

OMNI Antenna Beam SAR

More recently, wide bandwidth omni-directional antenna SAR systems have been introduced. Airborne Low Frequency Synthetic Aperture Radar (LF-SAR) operating in the VHF and UHF bands is becoming an important emerging technology for wide area surveillance and target detection in foliage. A VHF synthetic aperture radar system denoted CARABAS (Coherent All Radio Band Sensing) SAR system has been described in U.S. Pat. No. 4,965,582 and U.S. Pat. No. 4,866,446. An ultra wide band coherent radar system has been disclosed U.S. Pat. No. 6,072,420.

The function of the CARABAS system shall briefly be described in the following.

Figure 1:
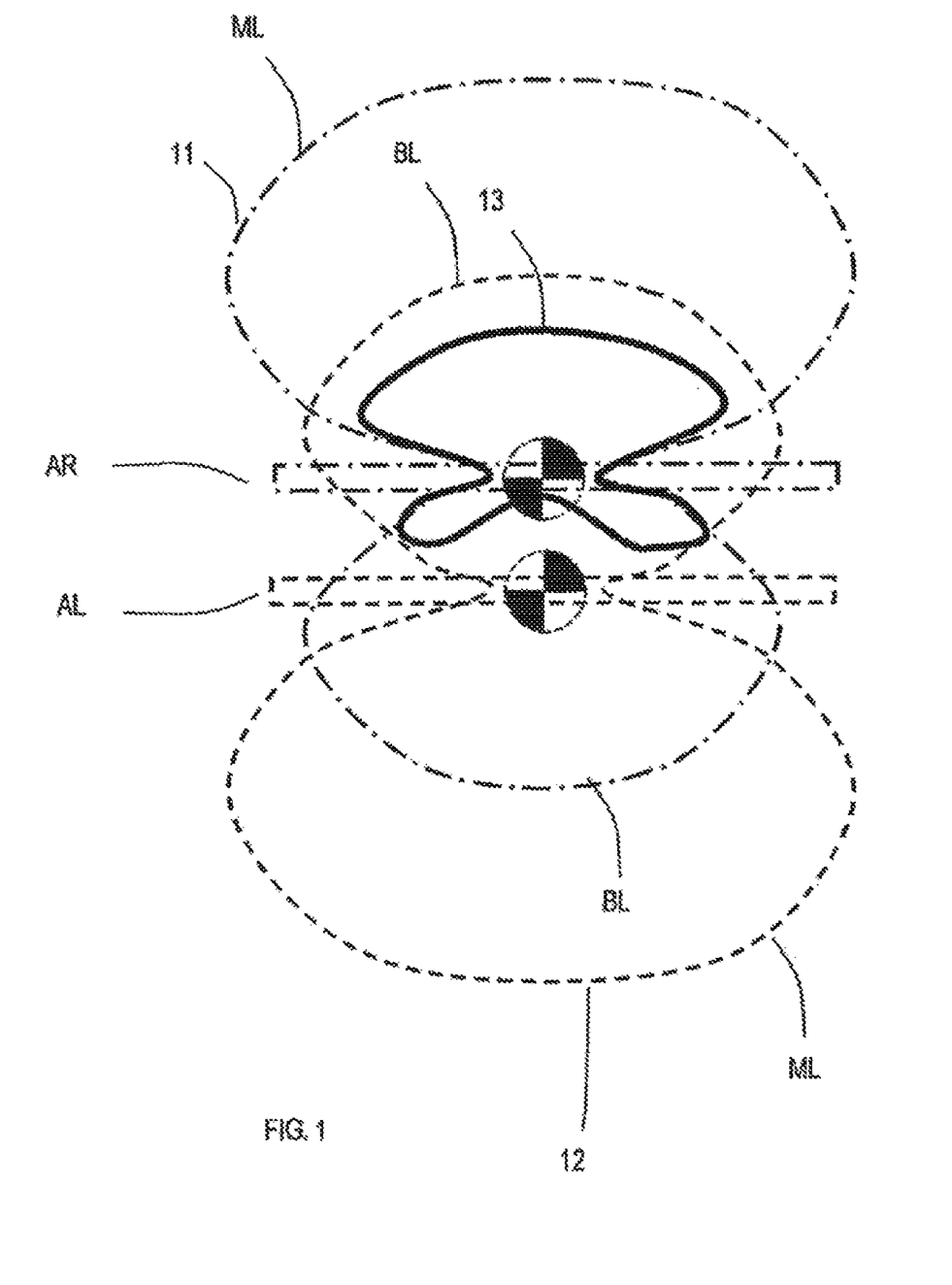
FIG. 1 shows an antenna diagram of a known two-boom antenna system.

The antenna diagram of the two boom CARABAS system, comprising a right antenna AR and a left antenna AL has been illustrated in FIG. 1, whereby the respective diagrams for left, 11, and right, 12, have been indicated. It is noted, that the each respective diagram is asymmetric because of the shading property of the adjacent antenna. A so-called main lobe ML and a backlobe BL appears for each antenna.

In the following, an account of the circuitry and the signal processing properties of the known CARABAS system shall be given with reference to FIGS. 2, 3 and 4.

Figure 2:
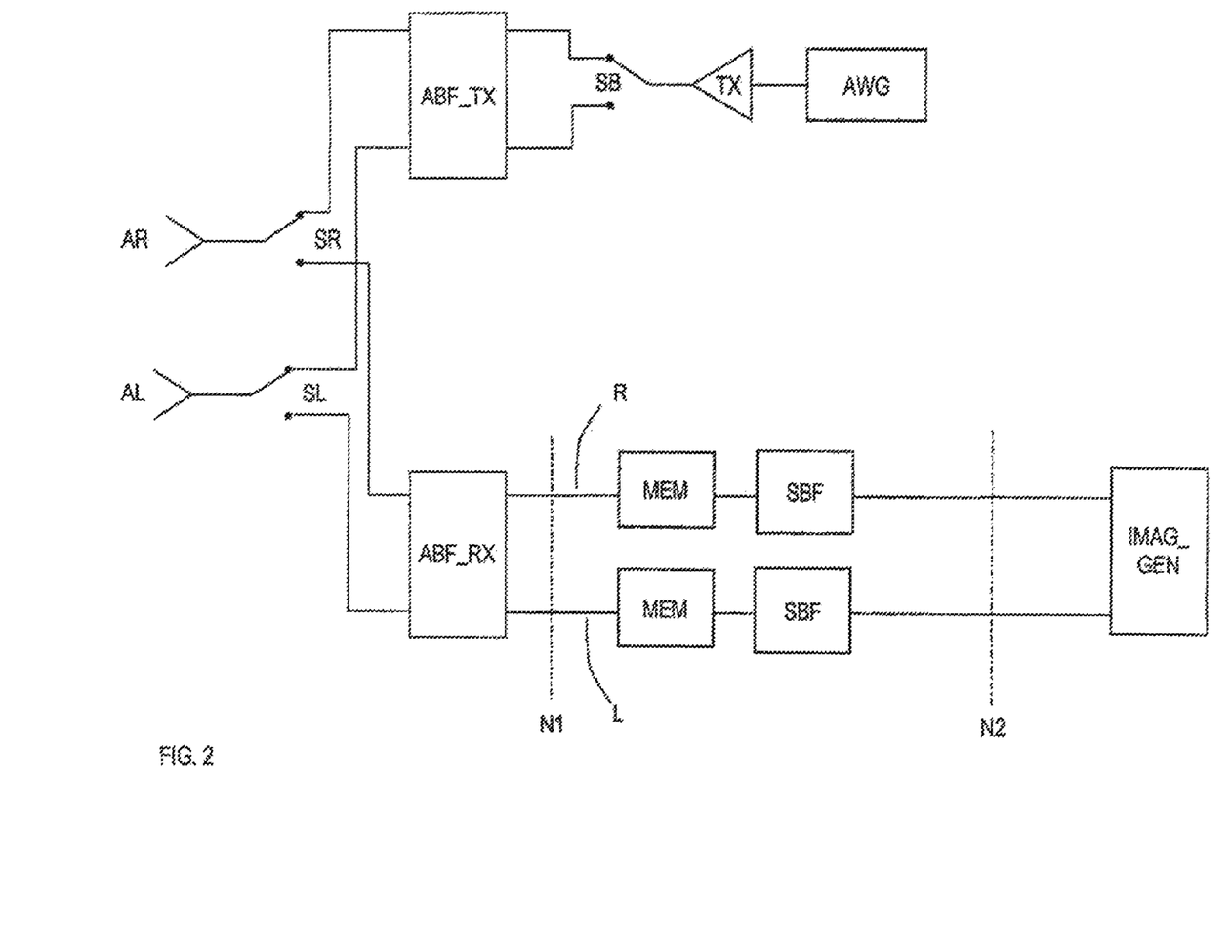
FIG. 2 shows a known SAR radar apparatus, known under the name CARABAS.
Figure 3:
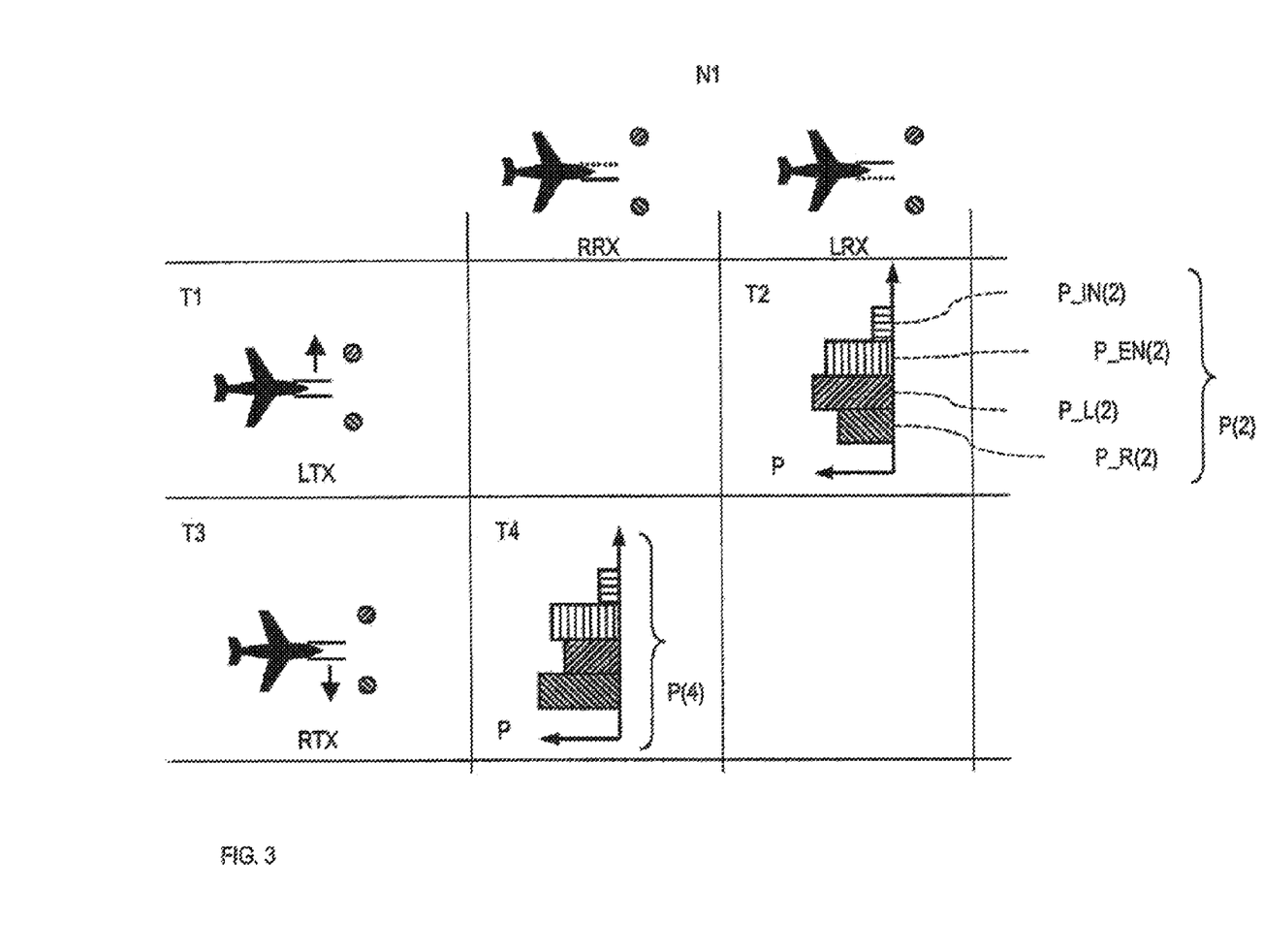
FIG. 3 shows the operation and imagined signal power properties for the radar apparatus shown in FIG. 2 at N1.

The known CARABAS system, as shown in FIG. 2, comprises an arbitrary signal generator AWG adapted to operate over a wide frequency range such as in the interval of 20 MHz-100 MHz, for instance emitting radar pulses using pulse compression techniques, such as generating a signal pulse with linearly increasing frequency, a so-called chirp. The system also comprises a transmit power amplifier TX, a switch SB, for feeding the generated pulse into a conventional additive beam forming transmit unit, ABF_TX.

By operating the switch, the antenna pair is excited to transmit a beam tilting more to one side of the aircraft than to the other. When the switch is flipped, the beam is reversed and tilts in the opposite direction with respect to left/right symmetry of the aircraft. For one position of the switch SB, the additive beam-forming transmit unit will produce a delayed signal at no power loss to a left antenna, AL, together with a non-delayed signal to a right antenna, AR, for transmitting the radar pulse to the left side of the platform.

The two antennas AR and AL are moreover connected to transmit/receive switches SR and SL. The switches are periodically steered in synchronization such as to either pass the signal being fed by arbitrary waveform generator AWG and a power amplifier TX or to receive the corresponding radar response.

In the receive path, an additive beam-forming receive unit, ABF_RX, is provided for amplifying signals coming from a desired direction and subduing signals coming from the opposite direction via the two antennas. This unit may be based on delay circuitry as is the case for ABF_TX and provides simultaneously a separate "resolved" left-hand signal and a separate "resolved" right-hand signal.

By issuing a pulse while directing the antenna system by means of ABF_TX to the right and subsequently receiving a pulse directing the antenna system to the right by means of ABF_RX, a gain in sensitivity separation is accomplished, the latter being indicated by the enhanced antenna diagram 13 in FIG. 1. As will be understood from the antenna diagram of FIG. 1, the directional separation is not perfect, why both left and right hand signals are "polluted" with signals stemming from the undesirable, i.e. back-lobe side, of the antenna system. It is seen that the gain in separation is highest for directions orthogonal to the antenna, while the separation is less effective for directions at slant angles with respect to the antennas.

The additive beam forming receive unit, ABF_RX, provides the respective left-hand side detected signals and the respective right-hand detected signals to respective memory bank, MEM.

An operation cycle T1-T4 of the above circuit shall now be explained with reference to FIG. 3, whereby the flying platform is moving over a featureless landscape except for two identical objects that are arranged symmetrically to a linear flight path. The signal magnitudes at N1 of FIG. 2 have been indicated in FIG. 3.

At time T1, a radar pulse is emitted to the left. At time T2, the antenna system is pointed to the left, whereupon a signal echo is received originating from both objects. The resulting signal is imagined as consisting of the following power contributions. P_IN refers to the signal contribution, which is caused by internal noise in the receiver section, P_EN refers to the external noise, P_L refers to the signal contribution originating from the left object and P_R refers to the signal contribution originating from the right object (the patterns (hatched) of FIG. 3 are used consistently throughout the application so as to identify these signals). The index LTX, LRX refers to a pulse being issued to the left and received as the antenna system is pointing left.

At time T3, a pulse is transmitted to the right and at time T4, the antenna system is receiving the responses while the antenna system is pointing right.

At the first measurement sequence T1 and T2, the resulting signal which is used for the imaging process is P(2)=P_IN(2)+P_EN(2)+P_L(2)+P_R(2). Since P_L(2)>P_R(2) and the sum of the external noise and the internal noise, P_IN(2)+

P_EN(2), are substantially constant over time, the resulting signal P(2) will be indicative of the properties of the left object although the "ghost" response from the right object will also appear due to the poor separation.

At the second measurement sequence T3 and T4, the properties are opposite and mainly the right object will contribute to the total signal. P_R(4)>P_L(4) so that the signal response from the right side object will contribute more to the subsequent image generation. Hence, the resulting image will not be free from the noise stemming from objects on the backlobe side.

It should be understood that the emitted beams to each respective side need not be mirror copies of each other but must—more importantly—be known to some degree of accuracy.

Synthetic Beamforming

For an omni-directional antenna, a singular emitted radar pulse will produce a spherical shell shaped wave, propagating at the speed of light from the aperture position. The corresponding pulse, when echoed, will undergo a change in Doppler shift depending on the angle to the direction of movement, which in this case is parallel to the antenna. At an angle perpendicular to the antenna the Doppler shift is zero.

The net signals—returning now to FIG. 2, are fed into respective memory banks MEM for the right side and the left side paths—are signal processed by well-known methods of coherent radar (e.g. Doppler beam sharpening), in synthetic beam forming units, SBF to obtain synthetic beams with respect to an assumed stationary ground. For an emitted given pulse or chirp, responses are associated and stored in both range bins, i.e. a resolved range interval, and resolved Doppler bins, i.e. directional bins albeit with a right left ambiguity.

Figure 4:
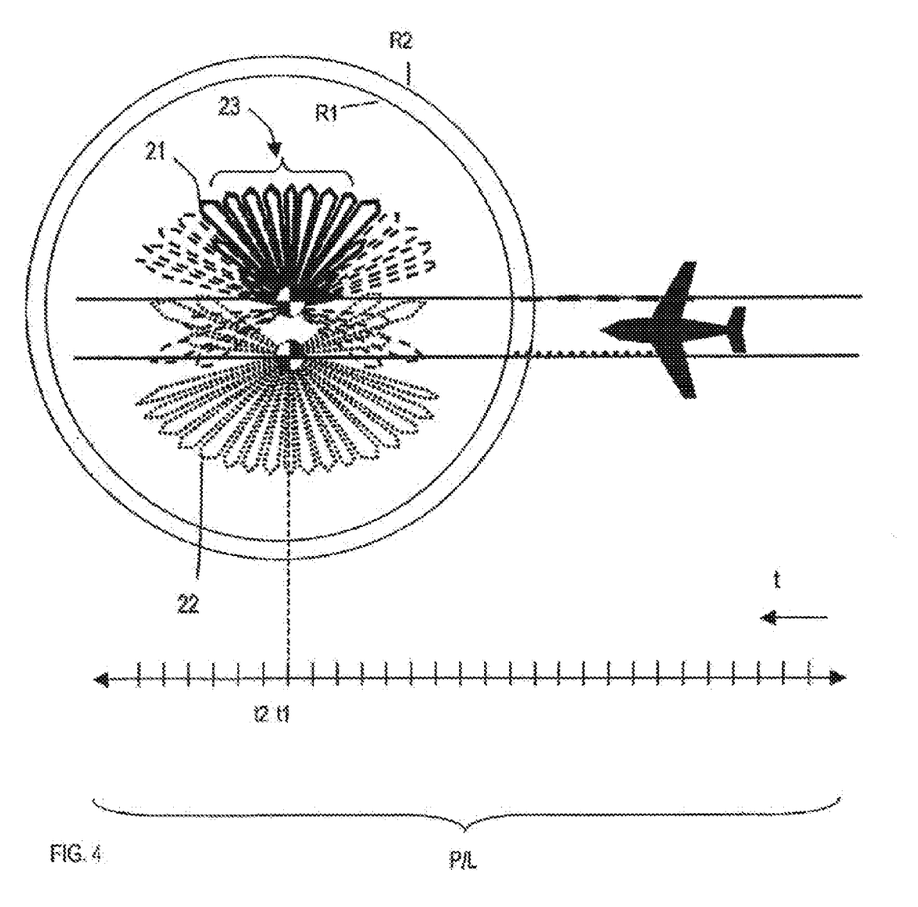
FIG. 4 is a schematic sketch of a known synthetic aperture radar (SAR) principle and the corresponding synthetic aperture.

In FIG. 4, the Doppler bins are illustrated as a number of leafs in the antenna diagram, whereby responses for a given direction is ambiguous with regard to left and right, e.g. leaf 21 and leaf 22. Using the left/right beam-forming directivity enhancement produced by ABF_TX and ABF_RX, the responses from the left, respectively, the right, is resolved/stored in synthetic beam forming unit SBF. The "right side" resolved synthetic beams have been shown under reference numeral 23.

The data of the respective synthetic beam forming units SBF are provided to an image generation unit, IMAG_GEN, which produce the resolved SAR picture.

SAR Algorithm

As shown in FIG. 4, during flying over the synthetic aperture length, L, a plurality of pulses, P, is emitted. During the same aperture length, a plurality of signals are received and arranged in range bins and Doppler bins.

Hence, the operation cycle T1-T4 is done starting from time t1, in FIG. 4. At time t2 the cycle is repeated.

As mentioned above, a singular emitted radar pulse will produce a spherical shell shaped wave, propagating at the speed of light from the aperture position. The corresponding responses to the radar pulse that are sampled and ordered in range bins will represent responses of arcs intersecting with ground. Hence, the given response from a single pulse for a given range bin will depend on the sum of responses along the arc on the ground, which again will depend on the ground reflectivity in all points along the arc. This has been illustrated in FIG. 4, where a pulse is emitted at t1 and whereby echoes from a certain distance corresponding to an arc, R1-R2, intersecting with ground will be produced. Please note that FIG. 4, and the other diagrams illustrating magnitudes, are only schematic.

Issuing multiple pulses along the aperture length, P/L, c.f. FIG. 4, and sampling the responses in range bins (and Doppler bins) provides a pattern with multiple arcs intersecting with one another (at directions for which the response can be resolved from the corresponding Doppler bin). From the accumulated ground reflectivity stemming from the intersecting arcs, (at the given directions also using the Doppler bins) the ground reflectivity in a given point on the ground can be resolved.

It is noted that the principle of SAR image generation works without making use of Doppler data. The amount of data processing, however, can be considerably reduced taking Doppler data in account.

Based on the stored data, the image generation unit, IMAG_GEN is performing the image generation on the respective right side, R, and left side, L, data.

Various methods may be used for the image generation process, for instance a method referred to as the "back projection method", described in "Synthetic-Aperture Radar processing using Fast Factorised Back-Projection" L H. Ulander, H. Hellsten, G. Stenström, IEEE Transactions on Aerospace and Electronic Systems Vol. 39, no. 3, July 2003.

These methods shall not be explained further here, as they are well known in the art. The Image generation performed in image generation unit shall therefore not be dealt with further.

Omni directional antenna based SAR systems (backprojection SAR) have enhanced resolution considerably. But omnidirectional antennas will only provide a clean, ghost free, high resolution SAR image when the input measurements or data is sufficiently separated as to left/right ambiguities.

SUMMARY OF THE INVENTION

Various embodiments of the invention furnish a technical solution to the problem of removing back lobe signals in a radar system in which back lobe signals—or ghost signals—pollute a signal from a main lobe. Various embodiments furnish a technical solution to the problem of isolating main lobe and backlobe influences such as for an airborne low frequency ground imaging radar, further, in order to suppress noise in the ground image caused by radar response coming from the backside through the backlobe. Various embodiments include a radar system being oriented in two directions reducing such backlobe noise. Various embodiments include a radar system isolating main lobe and back lobe influences.

Various embodiments include a method of processing signals in a radar system comprising an antenna system having at least two antennas shading each other whereby the respective diagrams for a first and for a second side is asymmetric for each antenna giving different sensitivity for the first and the second side for all antennas, a beam forming arrangement for selectively steering the directivity of the antenna system to a given selected side, the directivity of the antenna system having a main lobe at the selected side and a back lobe at the opposite side, and a first scale and subtract unit, the method comprising transmitting a first transmit signal by selectively steering the antenna system to a first side, sampling a first response signal by steering the antenna system to a second side, sampling a second response signal by steering the antenna system to the first side, subtracting the first response signal from the second response signal, thereby forming a sample value corresponding to properties mainly for the first side.

Various embodiments include a method of processing signals in a radar system comprising an antenna system having at least two antennas shading each other whereby the respective diagrams for a first and for a second side is asymmetric for each antenna giving different sensitivity for the first and the second side for all antennas, a beam forming arrangement for selectively steering the directivity of the antenna system to a given selected side, the directivity of the antenna system having a main lobe for the selected side and a back lobe at the opposite side, wherein the radar system further comprises a memory bank and a synthetic beam forming unit for storing data for a channel corresponding to each selected side according to predefined Doppler bins and a scale and subtract unit for each respective channel, the method comprising, transmitting a first transmit signal, by selectively steering the antenna system to a first side, sampling a first response signal by steering the antenna system to the first side, transmitting a second transmit signal, by selectively steering the antenna system to a second side, sampling a second response signal by steering the antenna system to the second side, forming a first Doppler value corresponding to the first sampled response signal from the first side for a given Doppler bin, forming a first scaled value of the Doppler value with a scaling value, forming a second Doppler value corresponding to the second sampled response signal from the second side and for the same given Doppler bin, forming a second scaled value of the Doppler value with a second scaling value, assessing a first response signal for a direction corresponding to the given Doppler bin and for the first selected side by subtracting the second scaled value from the first Doppler value, and assessing a second response signal for a direction corresponding to the given Doppler bin and for the second selected side by subtracting the first scaled value from the second Doppler value.

Various embodiments including a radar system comprising at least two antennas shading each other whereby the respective diagrams for a first and for a second side is asymmetric for each antenna giving different sensitivity for the first and the second side for all antennas, an arbitrary signal generator, an additive beam forming transmit unit for steering the antenna system to a given side, an additive beam forming receive unit for steering the antenna system to a given side, and a first scaling and subtraction unit operable to perform signal processing including:

transmitting a first transmit signal by selectively steering the antenna system to a first side, sampling a first response signal by steering the antenna system to a second side, sampling a second response signal by steering the antenna system to the first side, subtracting the first response signal from the second response signal, thereby forming a sample value corresponding to properties mainly for the first side.

Various embodiments include a radar system comprising at least two antennas shading each other whereby the respective diagrams for a first and for a second side is asymmetric for each antenna giving different sensitivity for the first and the second side for all antennas, an arbitrary signal generator, an additive beam forming transmit unit for steering the antenna system to a given side, an additive beam forming receive unit for steering the antenna system to a given side, and a memory bank, a synthetic beam forming unit for storing data for a channel corresponding to each selected side according to predefined Doppler bins, and a scale and subtract unit for each respective channel operable to perform signal processing including:

transmitting a first transmit signal, by selectively steering the antenna system to a first side, sampling a first response signal by steering the antenna system to the first side, transmitting a second transmit signal, by selectively steering the antenna system to a second side, sampling a second response signal by steering the antenna system to the second side, forming a first Doppler value corresponding to the first sampled response signal from the first side for a given Doppler bin, forming a first scaled value of the Doppler value with a scaling value, forming a second Doppler value corresponding to the second sampled response signal from the second side and for the same given Doppler bin, forming a second scaled value of the Doppler value with a second scaling value, assessing a first response signal for a direction corresponding to the given Doppler bin and for the first selected side by subtracting the second scaled value from the first Doppler value, and assessing a second response signal for a direction corresponding to the given Doppler bin and for the second selected side by subtracting the first scaled value from the second Doppler value.

Further advantages will be apparent to one of ordinary skill in the art from the following detailed description.

DETAILED DESCRIPTION OF PREFERRED EMBODIMENTS OF THE INVENTION

Figure 5:
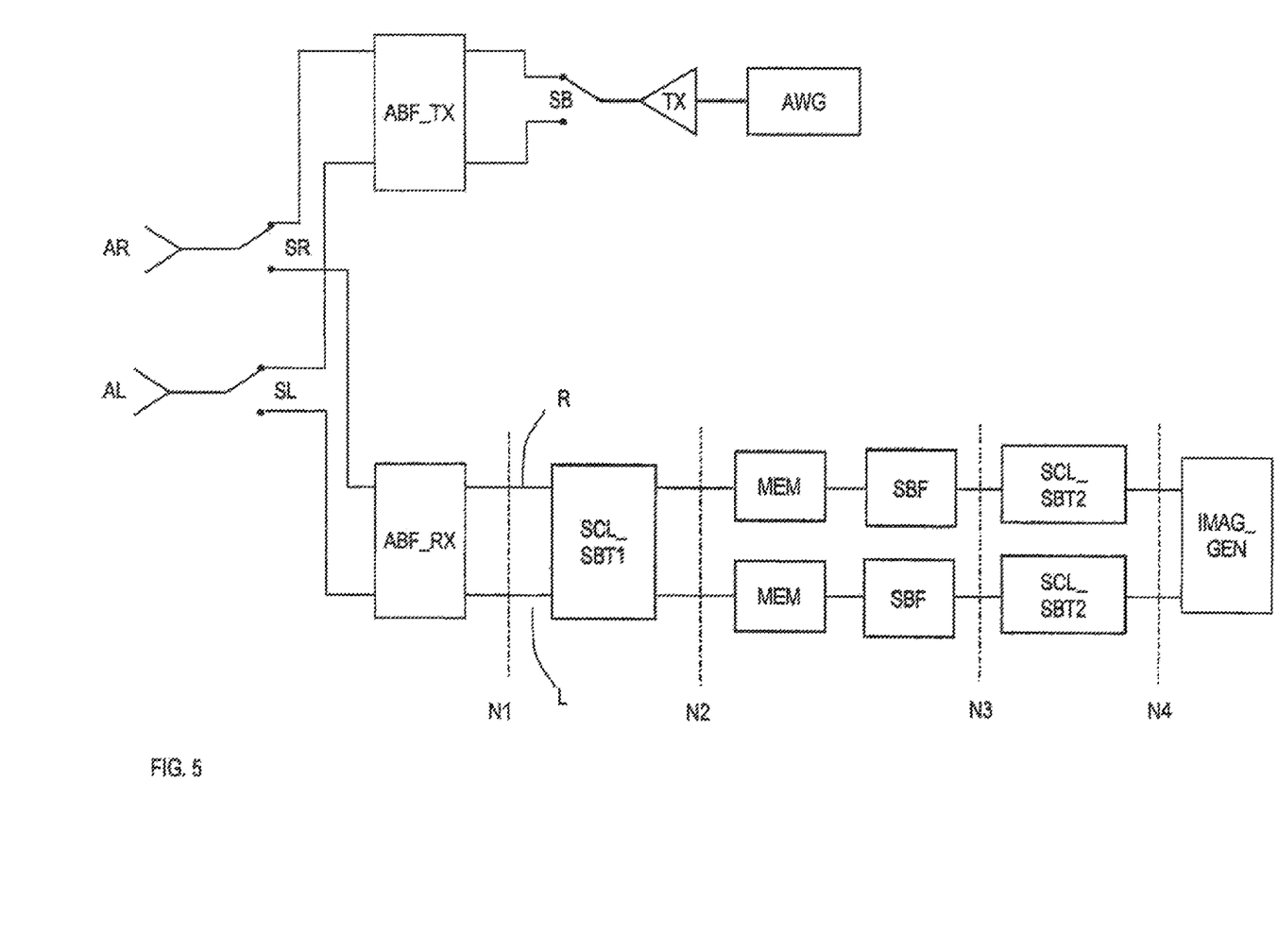
FIG. 5 shows a first embodiment of a radar apparatus according to the invention.
Figure 6:
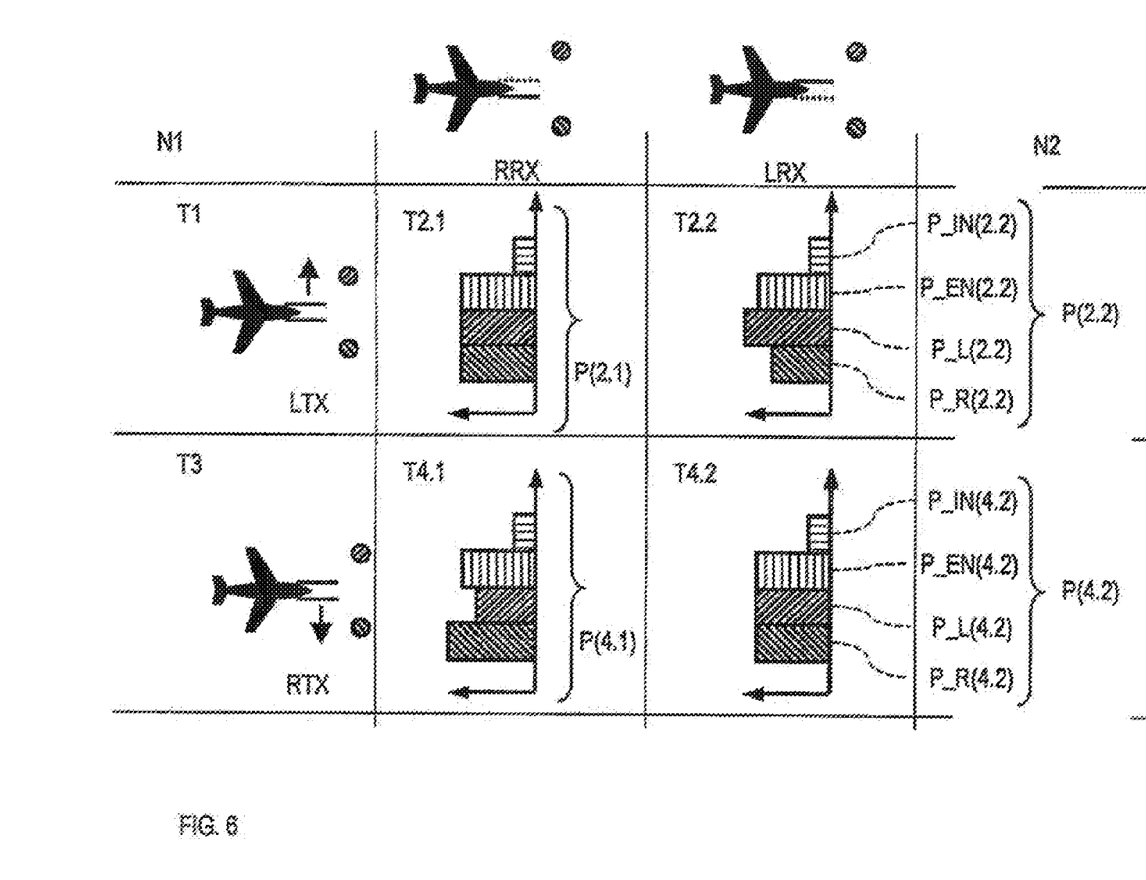
FIG. 6 shows the operation and imagined signal power properties for the radar apparatus shown in FIG. 8 in stage N1.
Figure 7:
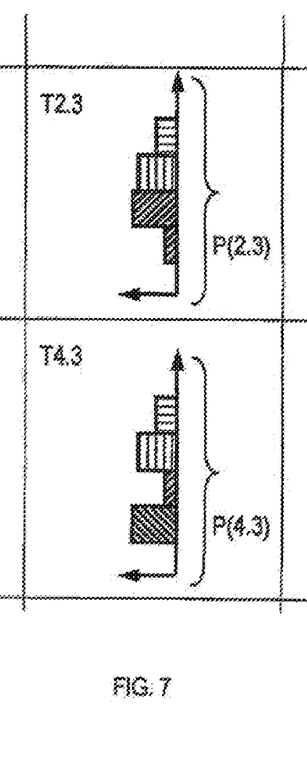
FIG. 7 shows the operation and imagined signal power properties for the radar apparatus shown in FIG. 5 in stage N2.

FIG. 5-7

In FIG. 5, a preferred embodiment of the system has been shown. In addition to the system shown in FIG. 2, a scaling and subtraction unit SCL_SBT1 is arranged between the additive beam forming receive unit, ABF_R, and the memories MEM. Moreover, scaling and subtracting units, SCL_SBT2, are arranged in each respective signal path between the respective SBF's and the image generation unit IMA_GEN. The functions of the units of the present embodiment having the same designation as for the prior art example given above are the same as, or at least analogue to, the functions of the prior art example.

As mentioned above, the antenna beam forming receive unit ABF_RX will register two beams, which are essentially right/left symmetric. Both beams are registered simultaneously in two parallel channels. These channels are fed into a scale and subtract network, SCL_SBT1, by which the back-lobe of each receive signal is scaled (also phase shifted) and subtracted—at the cost of overall receiver chain sensitivity as the back-lobe is expected to be significant.

The two net signals are moreover fed into memory banks MEM for the same purpose as mentioned above. They are then signal processed by the well-known methods of coherent radar (e.g. Doppler beam sharpening) to obtain synthetic beams with respect to an assumed stationary ground. The two derived signals are functions of look direction, albeit with a right left ambiguity. Subsequent to the synthetic beam forming, the two (L/R) signals are again scaled and subtracted in respective scale and subtract blocks, SCL_SBT2_R and SCL_SBT2_L.

The operation of the above circuit shall now be explained with reference to FIGS. 6 and 7, whereby, like in FIG. 3, a flying platform is moving over a featureless landscape except for two identical objects that are arranged symmetrically to a linear flight path. In FIGS. 6 and 7, an imaging situation of two points on the ground lying symmetric with respect to the aircraft path is depicted. The goal is to separate these points in the radar data. As is shown in FIG. 6, in either receiver channel RRX and LRX, and independently of which of the two transmit modes is in operation, the left contribution and the right contribution, see e.g. P_L(2.2) and P_R(2.2), to the registered signal are similar in strength with only small variations.

At time T1, a radar pulse is emitted to the left. At time T2 at measurement T2.1, the antenna is pointed to the right, whereupon a signal echo is received originating from both objects. The resulting signal P(2.1) is imagined consisting of the following power contributions: P_IN refers to the signal contribution, which is caused by internal noise in the receiver section, P_EN refers to the external noise, P_L refers to the signal contribution originating from the left object and P_R refers to the signal contribution originating from the right object. The index LTX, RRX refers to a pulse being issued to the left and received as the antenna system pointing right. Hence, the side of transmission at time T1 is opposite to the side of reception at time T2.1.

At time T2 and measurement T2.2, the procedure is continued, but this time the reception is directed to the same side as the signal was emitted and the response P(2.2) is received. In comparison with the measurement P(2.1), it is seen that the internal noise and the external noise is substantially constant at measurements T2.1 and T2.2, whereas the responses from the left object is of course stronger when directing the reception to the side to which the pulse was transmitted.

It should be understood that the measurements T2.1 and T2.2, corresponding to circuit stage N1, are sampled over a time period associated with time T2, hence the measurements can be considered to be performed practically simultaneously.

In subsequent scale and subtract unit, SCL_SBT1, the measurements P(2.1) and P(2.2) are subtracted from one another such that the signal P(2.3) and its components shown in FIG. 7 appears, corresponding to stage N2. The measurements P(2.1) and P(2.2) may also be interchanged in time.

It is seen that the rate [P_L(2.3)–P_R(2.3)]/P(2.3) is larger than [P_L(2.2)–P_R(2.2)]/P(2.2), hence the ghost signal arising from the "undesired" object has been suppressed according to this embodiment in relation to the prior art solution.

For low frequency radar, which typically experiences the greatly enhanced external noise of this frequency regime, the schematic principle of FIGS. 6 and 7 provides an uncompromising possibility of isolating right and left radar ground returns. It should be understood that the above principle is not restricted to SAR applications, but can be used in radar systems in general. It should moreover be emphasized that the principle can be used independently of antenna characteristics and antenna arrangement. The antennas need not necessarily be directed in opposite directions.

Applying the filter block SCL_SBT1_R, we can suppress the left influence in the right channel and the right influence in the left channel. The sensitivity of the antenna system is thereby greatly reduced (the more so, the more similar the antenna performance is in the four cases). However since exterior noise is correlated between the two antennas in the same way as to how the radar response is correlated, the sensitivity to exterior noise 2 is reduced as is shown in FIG. 7. Hence subtraction can be carried out to the extent that exterior noise becomes comparable to receiver interior noise 1, which is not correlated and thus not reduced in the separation process.

Hence a method has been shown for processing signals in a radar system comprising the steps of transmitting a first transmit signal (T1), by selectively steering the antenna to a first side (L); sampling a first response signal (P(2.1)) by steering the antenna to a second side (R); sampling a second response (P(2.2)) signal by steering the antenna to the first side (L); subtracting the first response signal (P(2.1)) from the second response signal (P(2.2)), thereby forming a sample value (P(2.3)) corresponding to properties mainly at the first side (L).

According to the invention it is found that the sensitivity to radar signals lost in SCL_SBT1_R is of little consequence, since the sensitivity to noise is reduced as well.

As a result the leakage from right to the left antenna is removed. Because there is a "back lobe to the back lobe", which subtracts from the main lobe, there will be a reduction in the resulting right antenna sensitivity of signals from the right. It is seen that the stronger the back lobe, the more effective is the reduction.

On the other hand, the separation between right and left is still incomplete as is shown in FIG. 7. Typically, the remaining right left ambiguity is so strong that it will shine through the noise floor 1 on subsequent processing, i.e. synthetic beam forming occurring in the block SBF.

The reason for the crudeness of SCL_SBT1_R is that it will only be perfect in at most one direction since the scaling will depend on the antenna diagram and thus the angle.

Figure 8:
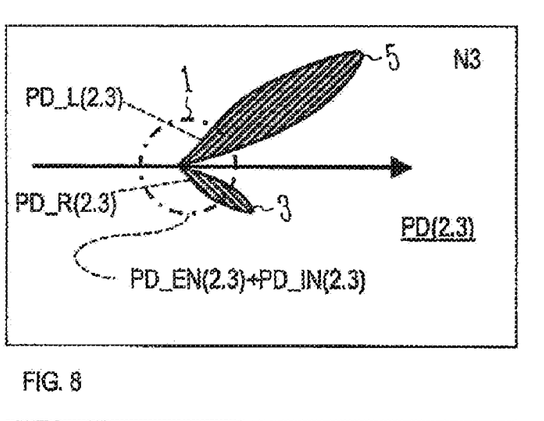
FIGS. 8 and 9 shows the operation and imagined signal power properties for the radar apparatus shown in FIG. 5 in stage N3.
Figure 9:
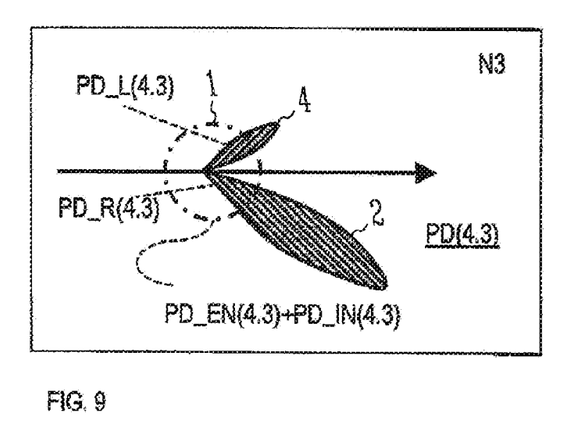
Figure 10:
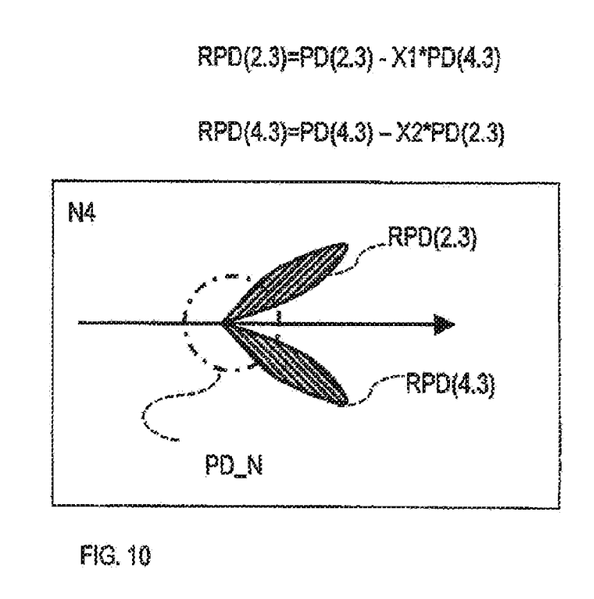
FIG. 10 shows the operation and imagined signal power properties for the radar apparatus shown in FIG. 5 in stage N4.

FIGS. 8, 9 and 10

According to a further embodiment, a second scale and subtraction process, performed in respective SCL_SBT2, is carried out for each channel, L and R.

In FIG. 8, the signals processing between subsequent signal stages N3 and N4 have been depicted as an example of one pair of synthesized beams. It should be noted that many synthetic beams are present in the system, but that only one pair of beams, corresponding to a given Doppler bin, is illustrated.

At N3 the left channel signal beam 5 corresponds to the level P_L(2.3) at N2 in FIG. 7, while the right channel beam 3 corresponds to P_R(2.3) in FIG. 7. The circular "beam" 1 of FIG. 8 corresponds to the sum of noise levels P_IN(2.3) and P_EN(2.3).

Likewise, in FIG. 9 the left channel beam 2 corresponds to P_L(4.3) and the right channel signal beam 4 corresponds to the level P_R(4.3) in FIG. 7. The circular "beam" of FIG. 9 corresponds to the sum of noise levels, PD_EN(4.3)+PD_IN (4.3).

It is noted, that the backlobe contribution and the mainlobe contribution of each respective signal in FIGS. 8 and 9 are part of the same signal and are not immediately discernable. The same applies to the noise value. But according to the invention it is acknowledged that the mainlobe of the opposing channel mirrors the backlobe of the given channel.

According to the further embodiment of the invention, the backlobe contribution of the given channel is estimated and subtracted from the mainlobe according to the following relations:

$$RPD(2.3) \sim PD(2.3) - x1*PD(4.3)$$

$$RPD(4.3) \sim PD(4.3) - x2*PD(2.3)$$

The scale values x1 and x2, which may be equal for a given direction preferably has a value below 1, and are for instance determined during calibration of the system, such that the left antenna measurement equal the magnitude of the right antenna back lobe.

Hence a preferred method has been disclosed of processing signals in a radar system, the method moreover comprising the steps of: transmitting a second transmit signal (T3), by selectively steering the antenna to the second side (R); sampling a third response signal (P(4.1)) by steering the antenna to a second side (R); sampling a fourth response (P4.2) signal by steering the antenna to the first side (L); subtracting the fourth response signal (P(4.2)) from the third response signal (P(4.1)), thereby forming a sample value (P(4.3)) corresponding to properties mainly at the second side (R).

The preferred method moreover comprises the steps of: forming a first Doppler value PD(2.3) corresponding to the first sampled value (P(2.3)) from the first side (L) for a given Doppler bin (N3); forming a first scaled value of the Doppler value with a scaling value (X1); forming a second Doppler value PD(4.3) corresponding to the second sampled value (P(4.3)) from the second side (R) and for the same given Doppler bin (N3); forming a second scaled value of the Doppler value with a second scaling value (X2); assessing a first response signal (RPD(2.3)) for a side corresponding to the given Doppler bin and for the first selected side (L) by subtracting the second scaled value (X1*PD(4.3)) from the first Doppler value (PD(2.3)), and assessing a second response signal (RPD(4.3)) for a direction corresponding to the given Doppler bin and for the second selected side (R) by subtracting the first scaled value (X2*PD(2.3)) from the second Doppler value (PD(4.3)).

As explained in the foregoing, the individual timing of pulses and measurements as explained under T1-T4.3 should preferably be arranged to coincide in time with the moment of arrival of the right signal to the left antenna upon which it is subtracted from the right antenna signal.

At stage N3, exterior noise is no longer correlated and the resulting noise floor, PD_N, at stage N4 will thus not be reduced in the SCL_SBT2_R process to the same extent as the radar signal. However, the degree of reduction of the radar signal depends on the size of the back-lobe prior to SCL_SBT2_R. As the noise has been significantly reduced already in SCL_SBT1_R, the cost in lost sensitivity in SCL_SBT2_R is small. Hence, the two-staged process of the invention provides the desired high performance of removing the right left ambiguity without any significant increase in noise or a consequential increase of transmit power.

Figure 11:
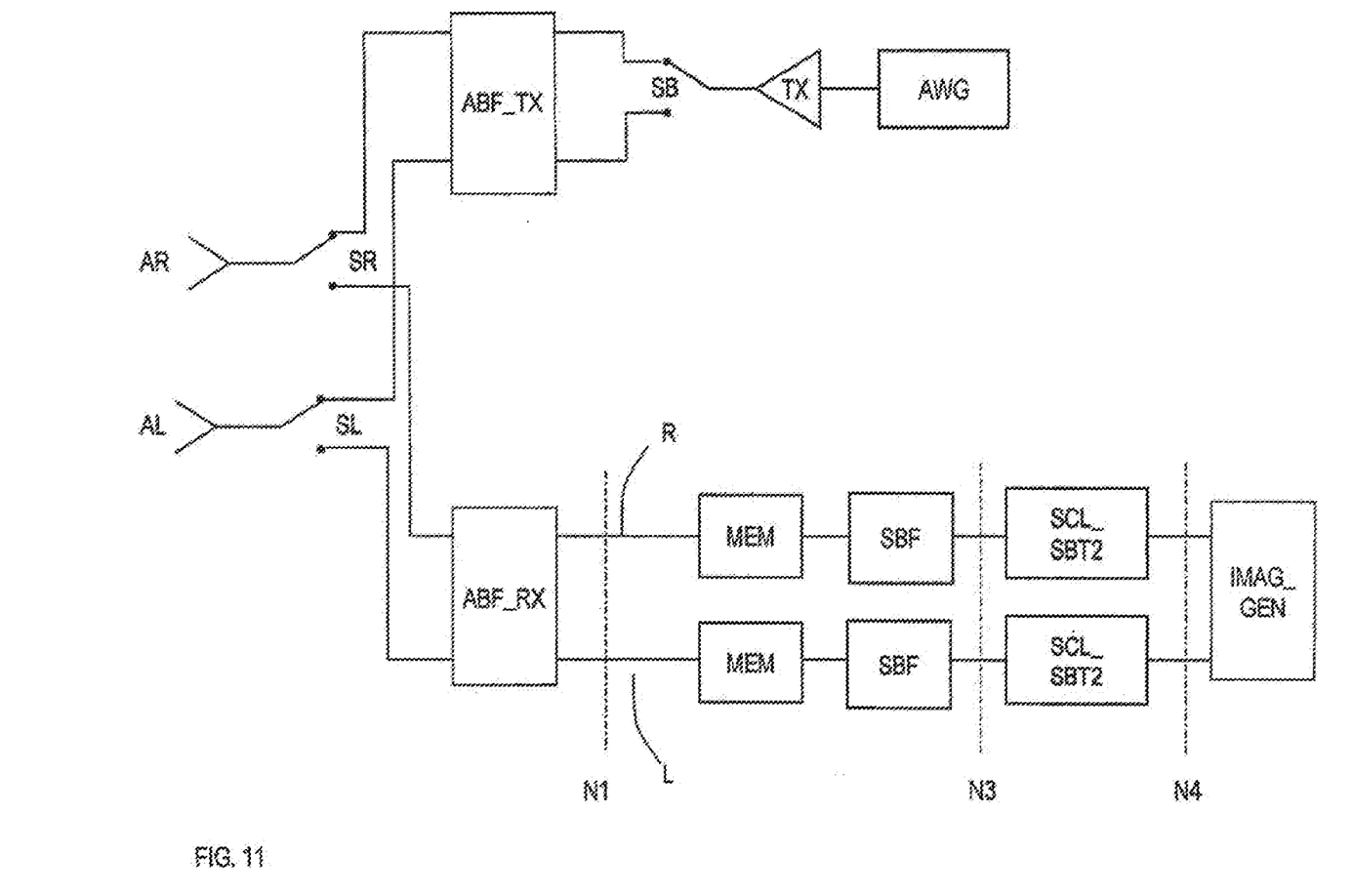
FIG. 11 shows a further embodiment of the invention.

FIG. 11

It should be understood that the process performed in the respective second scale and subtraction unit could be performed independently of the noise suppression performed in the first scale and subtract unit. Hence an embodiment corresponding to FIG. 5 is envisaged without scale and subtract unit SCL_SBT1. This embodiment has been shown in FIG. 11 whereby reference is again made to FIGS. 8, 9 and 10.

According to the FIG. 11 embodiment there is provided a method of processing signals in a radar system comprising the following steps:

Transmitting a first transmit signal (T1), by selectively steering the antenna to a first side (L);

sampling a first response signal (P(2)) by steering the antenna to the first side (L);

transmitting a second transmit signal (T2), by selectively steering the antenna to a second side (R);

sampling a second response signal (P(4)) by steering the antenna to the second side (R);

forming a first Doppler value PD(2.3) corresponding to the first sampled response signal (P(2)) from the first side (L) for a given Doppler bin (N3);

forming a first scaled value of the Doppler value with a scaling value (X1);

forming a second Doppler value PD(4.3) corresponding to the second sampled response signal (P(4)) from the second side (R) and for the same given Doppler bin (N3);

forming a second scaled value of the Doppler value with a second scaling value (X2);

assessing a first response signal (RPD(2.3)) for a side corresponding to the given Doppler bin and for the first selected side (L) by subtracting the second scaled value (X1*PD(4.3)) from the first Doppler value (PD(2.3)); and assessing a second response signal (RPD(4.3)) for a side corresponding to the given Doppler bin and for the second selected side (R) by subtracting the first scaled value (X2*PD (2.3)) from the second Doppler value (PD(4.3)).

Although the term radar systems has been used in the present application it should be understood that the principles of the present invention can also be used for other signals than radio range signals such as audio signals and hence sonar use. Likewise, although the system has been shown for a flying platform, the use of the system is also envisaged for other vehicles such as space vehicles.

The invention claimed is:

1. A method of processing signals in a radar system comprising:
    an antenna system having at least two antennas shading each other whereby the respective diagrams for a first and for a second side is asymmetric for each antenna giving different sensitivity for the first and the second side for all antennas,
    a beam forming arrangement for selectively steering the directivity of the antenna system to a given selected side, the directivity of the antenna system having a main lobe at the selected side and a back lobe at the opposite side, and a first scale and subtract unit, the method comprising
    transmitting a first transmit signal by selectively steering the antenna system to a first side,
    sampling a first response signal by steering the antenna system to a second side, sampling a second response signal by steering the antenna system to the first side,
subtracting the first response signal from the second response signal, thereby forming a sample value corresponding to properties mainly for the first side.

2. The method of processing signals in a radar system according to claim 1, the method further comprising
transmitting a second transmit signal, by selectively steering the antenna system to the second side,
sampling a third response signal by steering the antenna system to the second side,
sampling a fourth response signal by steering the antenna system to the first side,
subtracting the fourth response signal from the third response signal, thereby forming a sample value corresponding to properties mainly for the second side.

3. The method according to claim 2, wherein the radar system further comprises a memory bank and a synthetic beam forming unit for storing data for a channel corresponding to each selected side according to predefined Doppler bins and a second scale and subtract unit for each respective channel,
the method comprising
forming a first Doppler value corresponding to the first sampled value from the first side for a given Doppler bin,
forming a first scaled value of the Doppler value with a scaling value,
forming a second Doppler value corresponding to the second sampled value from the second side and for the same given Doppler bin,
forming a second scaled value of the Doppler value with a second scaling value,
assessing a first response signal for a side corresponding to the given Doppler bin and for the first selected side by subtracting the second scaled value from the first Doppler value, and
assessing a second response signal for a side corresponding to the given Doppler bin and for the second selected side by subtracting the first scaled value from the second Doppler value.

4. A method of processing signals in a radar system comprising:
an antenna system having at least two antennas shading each other whereby the respective diagrams for a first and for a second side is asymmetric for each antenna giving different sensitivity for the first and the second side for all antennas,
a beam forming arrangement for selectively steering the directivity of the antenna system to a given selected side, the directivity of the antenna system having a main lobe for the selected side and a back lobe at the opposite side,
wherein the radar system further comprises a memory bank and a synthetic beam forming unit for storing data for a channel corresponding to each selected side according to predefined Doppler bins and a scale and subtract unit for each respective channel,
the method comprising
transmitting a first transmit signal, by selectively steering the antenna system to a first side,
sampling a first response signal by steering the antenna system to the first side,
transmitting a second transmit signal, by selectively steering the antenna system to a second side,
sampling a second response signal by steering the antenna system to the second side,
forming a first Doppler value corresponding to the first sampled response signal from the first side for a given Doppler bin,
forming a first scaled value of the Doppler value with a scaling value,
forming a second Doppler value corresponding to the second sampled response signal from the second side and for the same given Doppler bin,
forming a second scaled value of the Doppler value with a second scaling value,
assessing a first response signal for a direction corresponding to the given Doppler bin and for the first selected side by subtracting the second scaled value from the first Doppler value, and
assessing a second response signal for a direction corresponding to the given Doppler bin and for the second selected side by subtracting the first scaled value from the second Doppler value.

5. The method according to claim 4, wherein the antennas are omnidirectional in at least a part of a given frequency range.

6. Method according to claim 5, wherein the radar system is a synthetic aperture radar (SAR) system.

7. The method according to claim 5, wherein the antennas are bar antennas mounted in parallel at a predefined distance.

8. A radar system comprising:
at least two antennas shading each other whereby the respective diagrams for a first and for a second side is asymmetric for each antenna giving different sensitivity for the first and the second side for all antennas,
an arbitrary signal generator,
an additive beam forming transmit unit for steering the antenna system to a given side,
an additive beam forming receive unit for steering the antenna system to a given side, and
a first scaling and subtraction unit operable to perform signal processing including:
transmitting a first transmit signal by selectively steering the antenna system to a first side,
sampling a first response signal by steering the antenna system to a second side,
sampling a second response signal by steering the antenna system to the first side,
subtracting the first response signal from the second response signal, thereby forming a sample value corresponding to properties mainly for the first side.

9. The radar system according to claim 8, further comprising a memory bank and a synthetic beam forming unit for storing data for a channel corresponding to each selected side according to predefined Doppler bins and a second scale and subtract unit for each respective channel.

10. A radar system comprising:
at least two antennas shading each other whereby the respective diagrams for a first and for a second side is asymmetric for each antenna giving different sensitivity for the first and the second side for all antennas,
an arbitrary signal generator,
an additive beam forming transmit unit for steering the antenna system to a given side,
an additive beam forming receive unit for steering the antenna system to a given side, and
a memory bank,
a synthetic beam forming unit for storing data for a channel corresponding to each selected side according to predefined Doppler bins, and
a scale and subtract unit for each respective channel operable to perform signal processing including:

transmitting a first transmit signal, by selectively steering the antenna system to a first side,
sampling a first response signal by steering the antenna system to the first side,
transmitting a second transmit signal, by selectively steering the antenna system to a second side,
sampling a second response signal by steering the antenna system to the second side,
forming a first Doppler value corresponding to the first sampled response signal from the first side for a given Doppler bin,
forming a first scaled value of the Doppler value with a scaling value,
forming a second Doppler value corresponding to the second sampled response signal from the second side and for the same given Doppler bin,
forming a second scaled value of the Doppler value with a second scaling value,
assessing a first response signal for a direction corresponding to the given Doppler bin and for the first selected side by subtracting the second scaled value from the first Doppler value, and
assessing a second response signal for a direction corresponding to the given Doppler bin and for the second selected side by subtracting the first scaled value from the second Doppler value.

11. The radar system according to claim 8, comprising a synthetic aperture radar (SAR) image generation unit.

12. The radar system according to claim 9, comprising a synthetic aperture radar (SAR) image generation unit.

13. The method according to claim 1, wherein transmitting a first transmit signal includes omnidirectional transmitting in at least a part of a given frequency range from the antennas.

14. The method according to claim 2, wherein transmitting a first transmit signal includes omnidirectional transmitting in at least a part of a given frequency range from the antennas.

15. The method according to claim 3, wherein transmitting a first transmit signal includes omnidirectional transmitting in at least a part of a given frequency range from the antennas.

16. The method according to claim 13, wherein sampling a first response signal includes sampling with bar antennas mounted in parallel at a predefined distance.

17. The method according to claim 1, wherein sampling a first response signal includes sampling with bar antennas mounted in parallel at a predefined distance.

18. The method according to claim 2, wherein sampling a first response signal includes sampling with bar antennas mounted in parallel at a predefined distance.

19. The method according to claim 3, wherein sampling a first response signal includes sampling with bar antennas mounted in parallel at a predefined distance.

20. The radar system of claim 8, wherein the radar system is further operable to perform signal processing including:
transmitting a second transmit signal, by selectively steering the antenna system to the second side,
sampling a third response signal by steering the antenna system to a second side,
sampling a fourth response signal by steering the antenna system to the first side,
subtracting the fourth response signal from the third response signal, thereby forming a sample value corresponding to properties mainly for the second side.

21. The radar system of claim 20, further comprising:
a memory bank and a synthetic beam forming unit for storing data for a channel corresponding to each selected side according to predefined Doppler bins and a second scale and subtract unit for each respective channel.

22. The radar system of claim 20, comprising a synthetic aperture radar (SAR) image generation unit.

23. The radar system of claim 20, further comprising:
a memory bank and a synthetic beam forming unit for storing data for a channel corresponding to each selected side according to predefined Doppler bins and a second scale and subtract unit for each respective channel; and
a synthetic aperture radar (SAR) image generation unit.

24. The radar system according to claim 10, comprising a synthetic aperture radar (SAR) image generation unit.

* * * * *